US012741517B2

(12) United States Patent
Bjorum et al.

(10) Patent No.: US 12,741,517 B2
(45) Date of Patent: Sep. 22, 2026

(54) CORNER BRACKET

(71) Applicant: Tarpstop, LLC, Perrysburg, OH (US)

(72) Inventors: Justin Bjorum, Wyoming, MI (US); Joe Callahan, Perrysburg, OH (US)

(73) Assignee: TARPSTOP, LLC, Perrysburg, OH (US)

( * ) Notice: Subject to any disclaimer, the term of this patent is extended or adjusted under 35 U.S.C. 154(b) by 432 days.

(21) Appl. No.: 18/184,234

(22) Filed: Mar. 15, 2023

(65) Prior Publication Data

US 2023/0294590 A1 Sep. 21, 2023

Related U.S. Application Data

(60) Provisional application No. 63/269,579, filed on Mar. 18, 2022.

(51) Int. Cl.
*B60J 7/06* (2006.01)

(52) U.S. Cl.
CPC .................................... *B60J 7/062* (2013.01)

(58) Field of Classification Search
CPC .................................. B60J 7/062; B60J 7/06
USPC ........... 296/100.08, 100.12, 100.16, 100.17; 403/205, 295
See application file for complete search history.

(56) References Cited

U.S. PATENT DOCUMENTS 7,931,326 B2 4/2011 Beshiri
8,172,477 B2 5/2012 Damsi
9,033,393 B2 5/2015 Damsi et al.
9,073,414 B2 * 7/2015 McKibben ........... B65D 88/125
9,555,698 B2 1/2017 Damsi et al.
9,744,834 B2 8/2017 Damsi et al.
9,797,156 B2 10/2017 Neumann et al.
10,183,559 B2 1/2019 DeMonte et al.
10,807,512 B2 10/2020 Weschke, Jr. et al.
11,491,854 B2 11/2022 Callahan et al.
11,505,046 B2 * 11/2022 Radulescu ............... B60J 7/065
11,597,263 B2 * 3/2023 Petelka .................... B60J 7/104
2008/0197664 A1 * 8/2008 Lowry ..................... B60J 7/062 296/100.18
2008/0217953 A1 * 9/2008 Beshiri .................... B60J 7/102 296/100.12
2010/0270825 A1 10/2010 Beshiri et al.
2011/0091271 A1 4/2011 Damsi
2023/0294590 A1 * 9/2023 Bjorum ..................... B60P 7/04 24/573.09
2023/0392429 A1 * 12/2023 Cottingham ............. B60J 7/062

* cited by examiner

*Primary Examiner* — Jason S Morrow
(74) *Attorney, Agent, or Firm* — Shumaker, Loop & Kendrick, LLP; James D. Miller

(57) ABSTRACT

A corner bracket for a tarp system for a vehicle includes a pair of arcuate main body portions with each of the main body portions including a central aperture formed therein and a sleeve disposed on each of the pair of main body portions with each of the sleeves having a central aperture aligned with the central aperture of the corresponding main body portion. Each of the sleeves includes a tarp retention channel configured to receive a portion of a tarp and a support pole therein. A fastener is configured to be received in the central aperture of each of the main body portions and the aperture of the sleeve of each of the main body portions to couple the main body portions to each other.

17 Claims, 5 Drawing Sheets

CORNER BRACKET

CROSS REFERENCE TO RELATED PATENT APPLICATION

This patent application claims the benefit of and priority to U.S. Pat. Appl. Ser. No. 63/269,579 filed on Mar. 18, 2022, the entire contents of which are incorporated herein by reference.

FIELD OF THE INVENTION

The invention relates generally to a tarp system, such as is utilized in enclosing a cargo space on a flatbed trailer or similar structure. More specifically, the invention relates to a corner bracket forming a component of a bow assembly of the tarp system.

BACKGROUND

Various types of freight are typically transported using a flatbed trailer that does not ordinarily enclose a space surrounding such freight. Such a configuration may be utilized to allow for the transport of freight that is unusually large, has an unusual or difficult to package shape, or that must be accessed from various different positions during a loading or unloading of the freight. It is accordingly common for such flatbed trailers to utilize a tarp system for enclosing the space around the freight, wherein such tarp systems can protect the freight from undesired interaction with the exterior elements and/or prevent visual access to the freight during the transport thereof.

Many such tarp systems typically comprise at least one bow assembly for supporting the corresponding tarp(s), wherein each of the bow assemblies forms a support structure or frame element for prescribing a desired configuration of the corresponding tarp(s) when installed thereto. For example, many such tarp systems include a plurality of the bow assemblies projecting away from the substantially planar flatbed with each of the bow assemblies spaced from adjacent ones of the bow assemblies while having an inverted U-shaped configuration. This U-shaped configuration may be formed by a modular bow assembly comprising a pair of opposing and substantially vertically arranged bows extending from the flatbed and one horizontally arranged bow connecting the pair of the vertically arranged bows. Such a modular configuration requires the use of a corner bracket for connecting each of the opposing ends of the horizontally arranged bow to a distal end of each of the vertically arranged bows in order to maintain the structural integrity of the enclosure.

The existing corner brackets utilized in connecting such bows typically include multiple different interacting components that significantly complicate the process of assembling each of the bow assemblies forming the corresponding tarp system. The use of such corner brackets can disadvantageously lead to an increase in time and effort each time the tarp system is assembled and/or disassembled. Related art is disclosed in U.S. Pat. Nos. 11,491,854; 10,807,512; 9,744,834; 9,701,348; 9,555,698; 9,033,393; 8,172,477; and 7,931,326, the entire contents of each of which are incorporated herein by reference.

There accordingly exists a need in the art for an improved corner bracket having a simplified construction for quickly and easily assembling a corresponding tarp system.

SUMMARY

In concordance with the instant disclosure, an improved corner bracket for use in a tarp system has been surprisingly discovered.

According to an embodiment of the present invention, a corner bracket for a tarp system for a vehicle includes a pair of arcuate main body portions with each of the main body portions including a central aperture formed therein and a sleeve disposed on each of the pair of main body portions with each of the sleeves having a central aperture aligned with the central aperture of the corresponding main body portion. Each of the sleeves includes a tarp retention channel configured to receive a portion of a tarp and a support pole therein. A fastener is configured to be received in the central aperture of each of the main body portions and the aperture of the sleeve of each of the main body portions to couple the main body portions to each other.

According to other aspects of the present invention, in some embodiments the main body portion may be produced from steel or aluminum and the sleeve may be produced from a plastic. The sleeve may be over molded on each of the main body portions of the corner bracket. A retention cavity may be formed in each of the main body portions, and each of the retention cavities may be filled with the plastic during the over molding. The corner bracket may include a tarp retention area formed by a pair of the opposed tarp retention channels. A lead-in edge may be formed at an end of each of the opposing channels. Each of the main body portions may include a first linear leg and a second linear leg, and the first linear leg and the second linear leg may be offset at an angle of 90 degrees. Each of the first linear leg and the second linear leg is configured to be received in a respective bow member. Each of the first linear leg and the second linear leg includes an aperture formed therein configured to receive a fastener therein to couple each of the main body portions to the respective bow member.

DETAILED DESCRIPTION OF THE INVENTION

Figure 1:
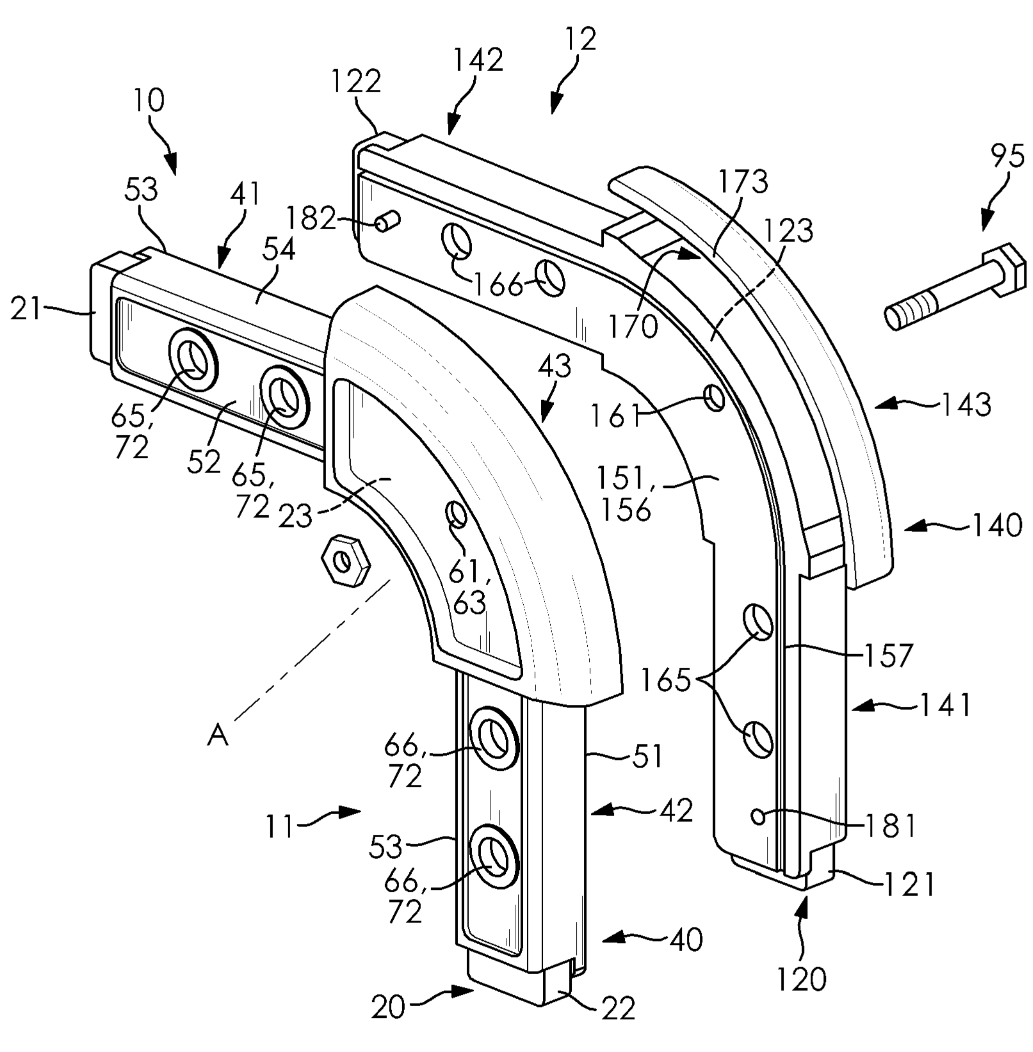
FIG. 1 is an exploded perspective view of a corner bracket according to an embodiment of the present invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then “about” and/or “substantially” as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term “comprising,” as a synonym of non-restrictive terms such as including, containing, or having, is used herein to describe and claim embodiments of the present technology, embodiments may alternatively be described using more limiting terms such as “consisting of” or “consisting essentially of.” Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of “from A to B” or “from about A to about B” is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

The present invention relates to a tarp system as may be utilized in conjunction with a flatbed trailer or the like. However, it should be apparent to one skilled in the art that the presently disclosed tarp system may be utilized in conjunction with any corresponding structure for forming an enclosed space while remaining within the scope of the present invention. The disclosed corner bracket may also be utilized in joining any two transversely arranged members with respect to alternative structures or systems not related to the use of tarps. The corner bracket is also not necessarily limited to those applications related to the enclosing of freight, and may alternatively be utilized in forming any type of enclosure for any purpose.

As shown in FIG. 1, the disclosed corner bracket 10 comprises a pair of members 11, 12 that cooperate with each other during a process of assembling the corner bracket 10. Each of the members 11, 12 is substantially identical in structure to facilitate the interchangeable nature of the members 11, 12 for easily assembling a plurality of the corner brackets 10 via use of a plurality of the members 11, 12. Specifically, any two of the plurality of the members 11, 12 may be utilized in forming one of the corner brackets 10, which allows for an ease of assembly of a tarp system utilizing a plurality of the corner brackets 10 for forming multiple bow members. As used herein, the members 11, 12 are referred to as the first member 11 and the second member 12. Due to the identical structure of each of the members 11, 12, only the structure of the first member 11 is described in detail hereinafter. The corresponding components of the second member 12 are also referred to hereinafter using the same terms used in describing the first member 11, and are identified in the drawings with reference numerals having a leading 1 (adding 100 thereto), but may not be referred to herein in the specification.

Figure 2:
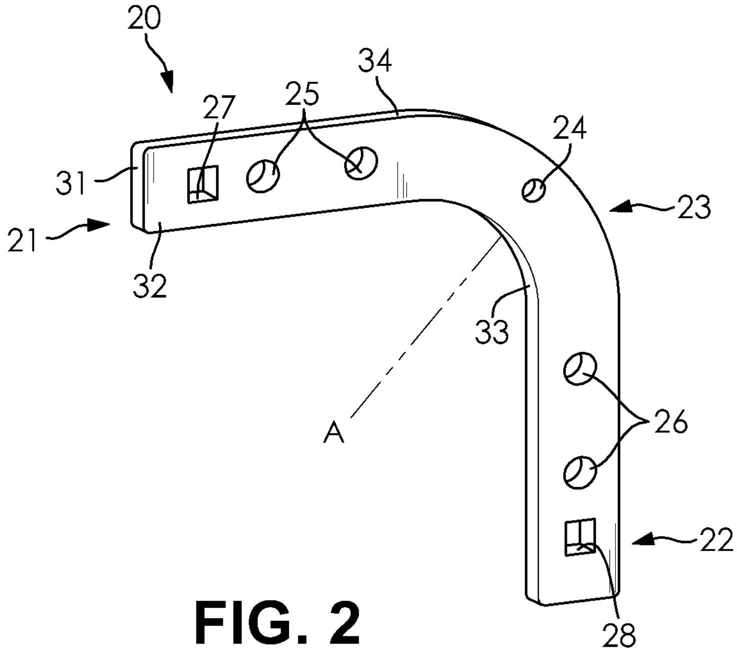
FIG. 2 is a perspective view of a main body portion of the corner bracket of FIG. 1.

The first member 11 includes a main body portion 20 and a sleeve 40 disposed around the main body portion 20. As shown in FIG. 2, the main body portion 20 includes a first leg 21, a second leg 22, and a connecting portion 23 connecting the first leg 21 to the second leg 22. The first leg 21 extends rectilinearly away from the connecting portion 23 in a first direction and the second leg 22 extends rectilinearly away from the connecting portion 23 in a second direction arranged transverse to the first direction. In the present embodiment, the first direction is arranged substantially perpendicular relative to the second direction. The 90 degree angular offset between the direction of extension of the first leg 21 and the direction of extension of the second leg 22 facilitates the use of the corner bracket 10 in connecting perpendicular arranged structures, such as a horizontally extending bow member and an adjacent vertically extending bow member of an associated tarp system. However, it should be apparent to one skilled in the art that the first direction and the second direction may be offset angularly from each other by angles other than 90 degrees while remaining within the scope of the present invention. For example, in some circumstances it may be desirable to connect bow members (or similar structural members) that approach each other at acute angles or obtuse angles, as desired.

The connecting portion 23 is shown as including an arcuate shape when connecting the first leg 21 to the second leg 22. Specifically, the connecting portion 23 extends through a 90 degree circular arc for connecting the first and second legs 21, 22 having the 90 degree angular displacement present therebetween. However, the connecting portion 23 may have an alternative shape while remaining within the scope of the present invention, including an arcuate shape having a varying radius of curvature when connecting the first and second legs 21, 22. The connecting portion 23 may also extend arcuately through any angle corresponding to the angular displacement between the first and second legs 21, 22, such as when the first and second legs 21, 22 are displaced from each other by an angle other than 90 degrees.

The first leg 21, the second leg 22, and the connecting portion 23 are provided to have shapes and dimensions for establishing a substantially symmetric configuration of the main body portion 20 about an axis A displaced angularly at an equal angle from each of the first direction corresponding to the direction of extension of the first leg 21 and the second direction corresponding to the direction of extension of the second leg 22 with each of the first direction, the second direction, and the axis A being arranged on a common plane. In the illustrated embodiment, the axis A is angularly displaced 45 degrees from each of the first direction and the second direction. As explained hereinafter, the symmetric configuration of the main body portion 20 aids in interchangeably coupling the first member 11 to the second member 12. The alternative configurations of the main body portion 20 contemplated hereinabove, including alternative angular displacements or alternative configurations of the connecting portion 23, may also include symmetry about the axis A for establishing the interchangeable nature of the resulting members 11, 12.

The main body portion 20 includes a plurality of through-holes formed therein with each of the through-holes penetrating the main body portion 20 in a third direction perpendicular to each of the first direction and the second direction. The through-holes include a central aperture 24, at least one first mounting aperture 25 formed in the first leg 21, at least one second mounting aperture 26 formed in the second leg 22, at least one first retention cavity 27 formed in the first leg 21, and at least one second retention cavity 28 formed in the second leg 22. The central aperture 24 is formed within the connecting portion 23 at a position intersecting the axis A, which corresponds to the axis of symmetry of the main body portion 20. Each of the first mounting apertures 25 is arranged symmetrically relative to one of the second mounting apertures 26 with respect to the axis A while each of the at least one retention cavities 27 is similarly arranged symmetrically relative to one of the second retention cavities 28 with respect to the axis A.

In the present embodiment, the first leg 21 includes a pair of the first mounting apertures 25 and one of the first retention cavities 27 while the second leg 22 includes a corresponding pair of the second mounting apertures 26 and one of the second retention cavities 28. The first mounting apertures 25 are spaced from each other with respect to the first direction while the second mounting apertures 26 are spaced from each other with respect to the second direction. The first retention cavity 27 is disposed outwardly of the first mounting apertures 25 towards a distal end of the first leg 21 and the second retention cavity 28 is disposed outwardly of the second mounting apertures 26 towards a distal end of the second leg 22. However, alternative configurations and arrangements of the described through-holes may be utilized while remaining within the scope of the present invention, so long as the symmetric relationships described hereinabove are maintained for maintaining the interchangeable nature of the first and second members 11, 12 forming the corner bracket 10.

The main body portion 20 is shown as having a substantially rectangular cross-sectional shape that is extended along a length thereof between the distal ends of the legs 21, 22, but the main body portion 20 may have alternative cross-sectional shapes while remaining within the scope of the present invention.

The main body portion 20 may be formed from a rigid material such as a metallic material or metal. In some embodiments, the metal may be steel or aluminum. However, any substantially rigid material having the desired structural strength for the given application may be selected for forming the main body portion 20, as desired.

The sleeve 40 is over molded onto the main body portion 20 to allow for the sleeve 40 to surround and contact the main body portion 20 along at least a portion of a length thereof. More specifically, the over molding of the sleeve 40 onto the main body portion 20 allows for an inner surface of the sleeve 40 to be in direct contact with an outer surface of the main body portion 20. This direct contact may occur around an entirety of a perimeter of the main body portion 20 with respect to at least a portion of a length of the main body portion 20. The retention cavities 27, 28 are provided to allow for the material forming the sleeve 40 to flow between opposing sides of the sleeve 40 with respect to the third direction while flowing through the main body portion 20, thereby aiding in affixing a position of the sleeve 40 relative to the main body portion 20. In contrast, the central aperture 24 and each of the mounting apertures 25, 26 are not filled with the molding material to form through-holes for the reception of fasteners therethrough, as explained in greater detail hereinafter.

The sleeve 40 includes a shape and configuration substantially corresponding to that of the main body portion 20 and includes a first leg 41 extending rectilinearly in the first direction, a second leg 42 extending rectilinearly in the second direction, and a connecting portion 43 connecting the first leg 41 to the second leg 42. The connecting portion 43 includes an arcuate shape corresponding to that of the connecting portion 23 of the main body portion 20. In the illustrated embodiment, the connecting portion 43 has the shape of a 90 degree circular arc for connecting the perpendicular arranged first and second legs 41, 42. The connecting portion 43 may have any shape suitable for corresponding to the shape of the connecting portion 23, as desired.

Figure 3:
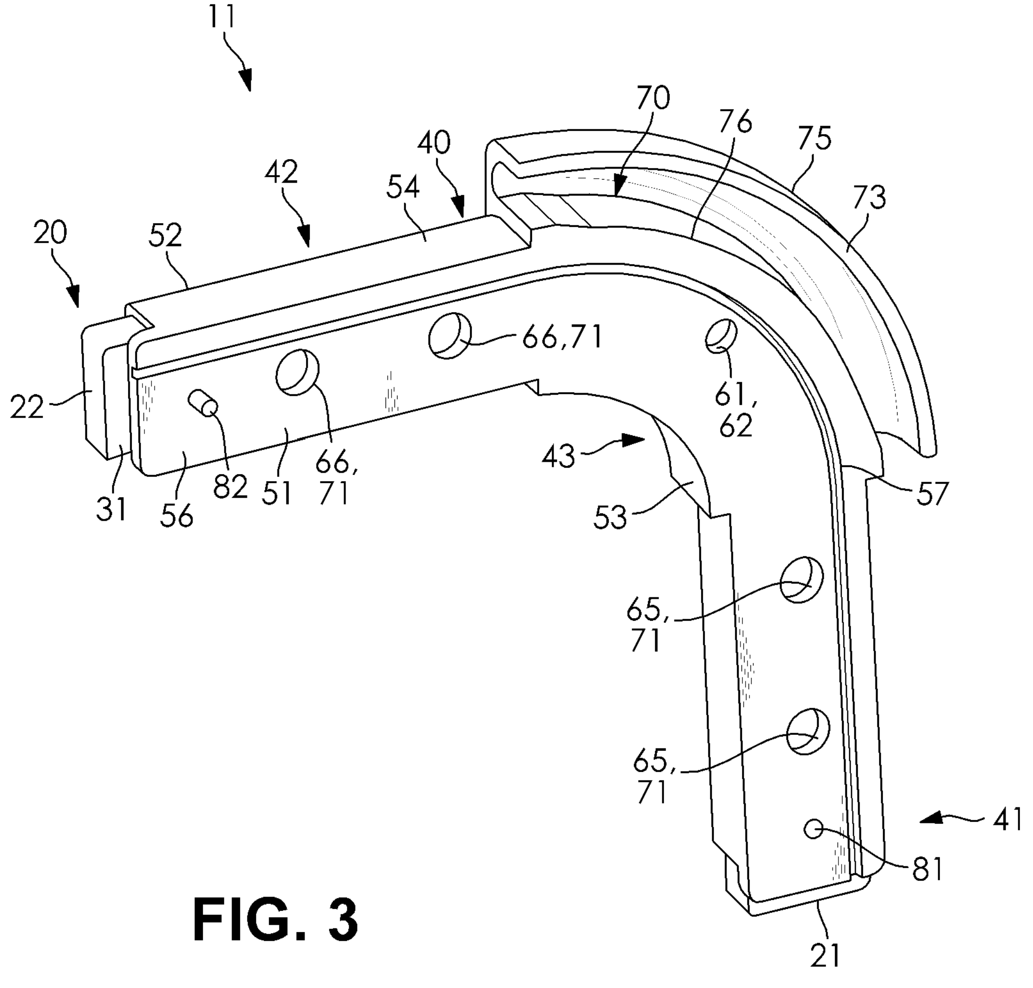
FIG. 3 is a perspective view of a first member of the corner bracket including the main body portion of FIG. 2 and a sleeve overmolded onto the main body portion.

The sleeve 40 includes four different walls 51, 52, 53, 54 extending peripherally around the main body portion 20. The walls includes a first wall 51 extending along a first major surface 31 of the main body portion 20 (shown in FIG. 3), a second wall 52 extending along a second major surface 32 of the main body portion 20 disposed opposite the first major surface 31, a third wall 53 connecting the first wall 51 to the second wall 52 along a first side surface 33 of main body portion 20 corresponding to a concave surface thereof, and a fourth wall 54 connecting the first wall 51 to the second wall 52 along a second side surface 34 of the main body portion 20 disposed opposite the first side surface 33 and corresponding to a convex surface thereof.

The sleeve 40 includes a central aperture 61 formed by the cooperation of a first central aperture 62 formed through the first wall 51 and a second central aperture 63 formed through the second wall 52. The central aperture 24, the first central aperture 62, and the second central aperture 63 are aligned with each other with respect to the third direction to facilitate the reception of a fastener therethrough.

The sleeve 40 further includes at least one mounting aperture. In the present embodiment, the first leg 41 includes a pair of first mounting apertures 65 and the second leg 42 includes a corresponding pair of the second mounting apertures 66. Each of the first mounting apertures 65 corresponds to one of the first mounting apertures 25 and each of the second mounting apertures 66 corresponds to one of the second mounting apertures 26. The first and second mounting apertures 65, 66 are accordingly arranged symmetric relative to the axis A in similar fashion to the first and second mounting apertures 25, 26. Each of the mounting apertures 65, 66 is formed by the cooperation of a first aperture 71 formed through the first wall 51 and a second aperture 72 formed through the second wall 52. Each of the mounting apertures 25, 26 formed through the main body portion 20 is aligned with a corresponding pair of the apertures 71, 72 forming one of the mounting apertures 65, 66 with respect to the third direction to facilitate the reception of a fastener therethrough.

An outer surface of the first wall 51 includes a planar portion 56 arranged on a plane arranged parallel to a plane defined by the first and second directions, wherein such a plane is perpendicular to the described third direction. The outer surface of the first wall 51 further includes a sealing channel 57 indented relative to the planar portion 56 in the third direction towards the opposing second wall 52. The sealing channel 57 is configured to receive a bead of a suitable sealant when coupling the members 11, 12 to each other, as described hereinafter.

The connecting portion 43 of the sleeve 40 includes a tarp retention channel 70 formed therein. The tarp retention channel 70 is defined by the cooperation of the fourth wall 54 and a hooded portion 75 of the sleeve 40 projecting arcuately from the fourth wall 54. The tarp retention channel 70 includes a substantially C-shaped cross-section extending from an inner edge 76 formed at an intersection of the first wall 51 and the fourth wall 54 to a lead-in edge 73 formed at a distal end of the hooded portion 75. The lead-in edge 73 is offset from the plane defined by the planar portion 56 of the first wall 51 with respect to the third direction to allow for a gap to be present between the opposing lead-in edges 73, 173 of the first and second members 11, 12 when the corner bracket 10 is in the assembled configuration. The C-shaped cross-section is maintained along a length of the tarp retention channel 70 from an end thereof adjacent the first leg 41 to an end thereof adjacent the second leg 42, which includes the C-shaped cross-section being extended through a 90 degree circular arc corresponding to the shape of the fourth wall 54 of the sleeve 40. The tarp retention channel 70 is open at each longitudinal end thereof where the connecting portion 43 transitions to the legs 41, 42.

The connecting portion 43 of the sleeve 40 may include a greater thickness or width than the adjacent legs 41, 42 thereof to allow for the outer surfaces of the connecting portion 43 to be arranged substantially continuously with the outer surfaces of the adjoining bow members coupled to the corner bracket 10 when forming a portion of a tarp system, as described in greater detail when discussing a method of assembling the corner bracket 10.

The sleeve 40 has generally been described as being symmetric relative to the axis A, but the sleeve 40 may include at least one asymmetric feature to aid in aligning the first and second members 11, 12 when assembling the corner bracket 10. For example, in the illustrated embodiment, the first leg 41 includes a first locating feature 81 while the second leg 42 includes a second locating feature 82. The first locating feature 81 and the second locating feature 82 include different and complimentary shapes. In the illustrated embodiment, the first locating feature 81 is a cylindrical opening and the second locating feature 82 is a cylindrical pin substantially corresponding in shape and size to the opening. The cylindrical opening and the cylindrical pin each extend axially in the third direction. The first and second locating features 81, 82 remain positioned symmetrically relative to the axis A to allow for the first locating feature 81 of the first member 11 to be received within the second locating feature 182 of the second member 12 and for the first locating feature 181 of the second member 12 to be received within the first locating feature 81 of the first member 11. The disclosed complimentary shapes are merely exemplary in nature, and may be replaced by any complimentary shapes that cooperate with each other in locating the first member 11 relative to the second member 12 when the members 11, 12 approach each other with respect to the third direction.

The sleeve 40 may include various reinforcing features formed at or around a periphery of any of the described components in order to increase a bending stiffness of the sleeve 40 with respect to desired planes extending therethrough. Any configuration of such reinforcing features may be utilized while remaining within the scope of the present invention. The reinforcing features may include ribs, thickened portions, or other structural features configured to increase a bending stiffness of the sleeve 40.

The sleeve 40 is described as being overmolded onto the main body portion 20. The sleeve 40 may accordingly be formed from any moldable or flowable material capable of taking on the configurations shown and described herein. The sleeve 40 may be formed from a polymeric material, such as a suitable plastic, elastomer, or combinations thereof, as desired. In some embodiments, the corner bracket 10 may include the main body portion 20 formed from steel or aluminum and the sleeve 40 formed from plastic, as one non-limiting combination. The sleeve 40 may be formed using any suitable molding or casting process, as desired.

Referring now to FIG. 1, a method of assembling the corner bracket 10 and installing the corner bracket 10 into a corresponding bow assembly is disclosed. First, a first member 11 and a second member 12, each of which are identical in configuration, are selected for forming the corner bracket 10. Assuming both of the members 11, 12 start from the same initial orientation, one of the members 11, 12 is rotated 180 degrees relative to the described axis A to place the planar surface 56 of the first wall 51 of the first member 11 in facing relationship with the planar surface 156 of the first wall 151 of the second member 12. The described rotation also places the first legs 21, 41 of the first member 11 in general alignment with the second legs 122, 142 of the second member 12 with respect to the third direction, the second legs 22, 42 of the first member 11 in general alignment with the first legs 121, 141 of the second member 12, and the connecting portions 23, 43 of the first member 11 in general alignment with the connecting portions 123, 143 of the second member 12.

Prior to assembly, a bead of a sealant or the like may be applied to the sealing channel 57 of the first member 11 and the sealing channel 157 of the second member 12. Next, the first and second members 11, 12 are caused to approach each other with respect to the third direction while specifically aligning the locating features 81, 82, 181, 182 with respect to the third direction. The locating features 81, 82, 181, 182 eventually mate with each other and the members 11, 12 continue to approach each other until the opposing planar surfaces 56, 156 are placed in contact with each other, which also ensures that the sealant is compressed between the opposing sealant channels 57, 157. Additionally, each of the described features of the first legs 21, 41 of the first member 11 is now aligned with each of the corresponding features of the second legs 122, 142 of the second member 12 with respect to the third direction. Specifically, each of the apertures 61, 65, 66 formed through the sleeve 40 of the first member 11 is aligned with one of the corresponding apertures 161, 165, 166 of the sleeve 140 of the second member 12.

Next, a central fastener 95 is received through the aligned central apertures 24, 61, 124, 161 with respect to the third direction. The central fastener 95 may be any type of fastener configured to apply a compressive load to the corner bracket 10 with respect to the third direction, such as a threaded bolt and nut assembly. A tightening of the central fastener 95 results in the first and second members 11, 12 being affixed in position relative to each other due to the interactions present between the locating features 81, 82, 181, 182, the planar surfaces 56, 156, and the opposing bearing surfaces of the central fastener 95.

The coupling of the members 11, 12 to each other results in the corner bracket 10 having a configuration including a first leg 15 including the first legs 21, 41 and the second legs 122, 142, a second leg 16 including the second legs 22, 42 and the first legs 121, 141, and a connecting portion 17 connecting the first leg 15 to the second leg 16. The first leg 15 extends rectilinearly in the first direction, the second leg 16 extends rectilinearly in the second direction, and the connecting portion 17 extends arcuately along a 90 degree circular arc curving about the third direction. The connecting portion 17 includes the tarp retention channels 70, 170 facing towards each other with the lead-in edges 73, 173 spaced apart with respect to the third direction to form a gap between the lead-in edges 73, 173. The tarp retention channels 70, 170 cooperate with each other to form a tarp retention area 18 of the corner bracket 10, which is configured to receive a portion of a tarp and a portion of at least one support pole therein. The tarp retention area 18 may include a substantially C-shaped cross-sectional shape extended longitudinally between opposing open ends of the tarp retention area 18.

Figures 4, 5:
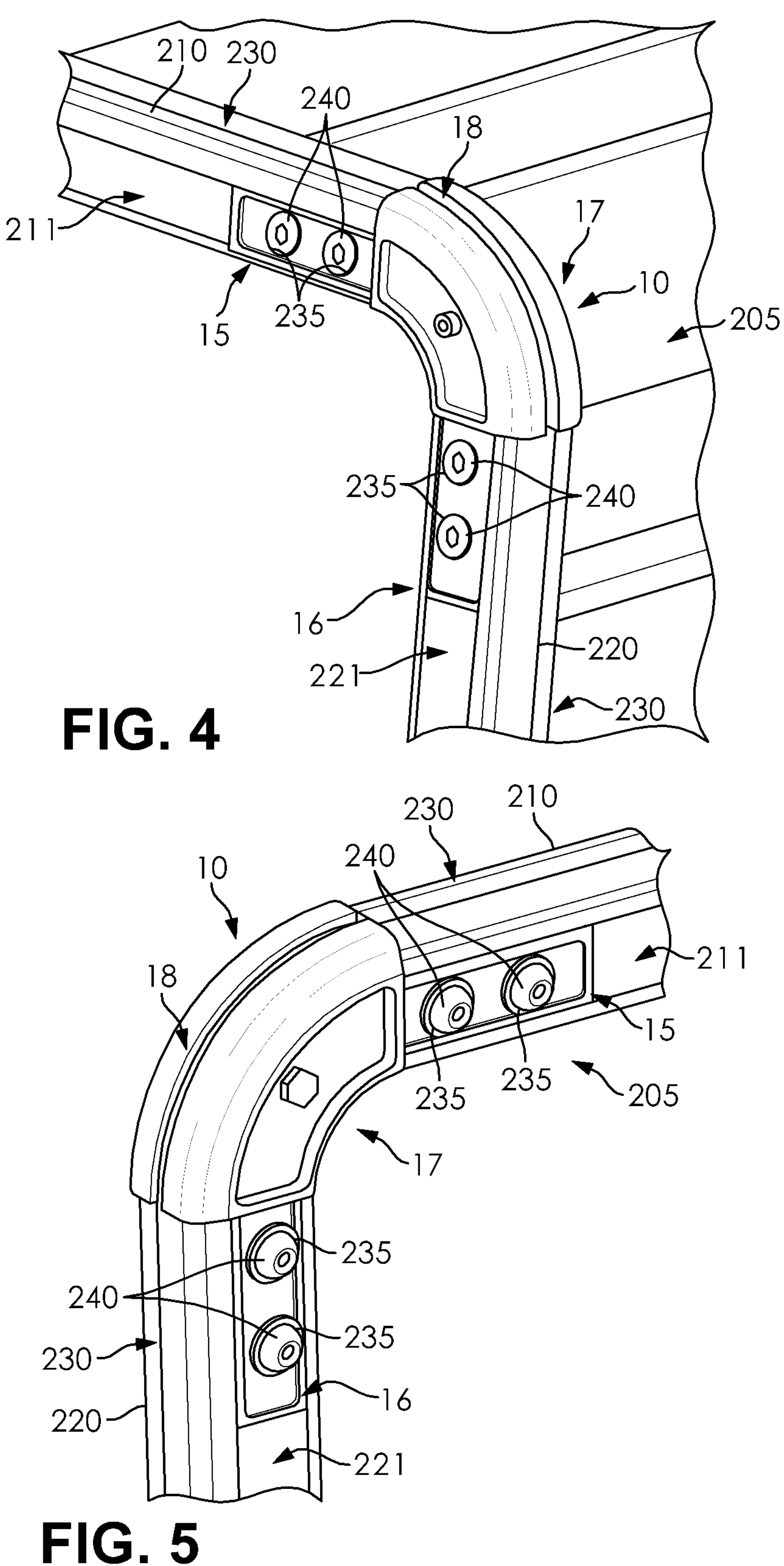
FIGS. 4 and 5 are perspective views showing the corner bracket installed into a corresponding bow assembly.
Figure 6:
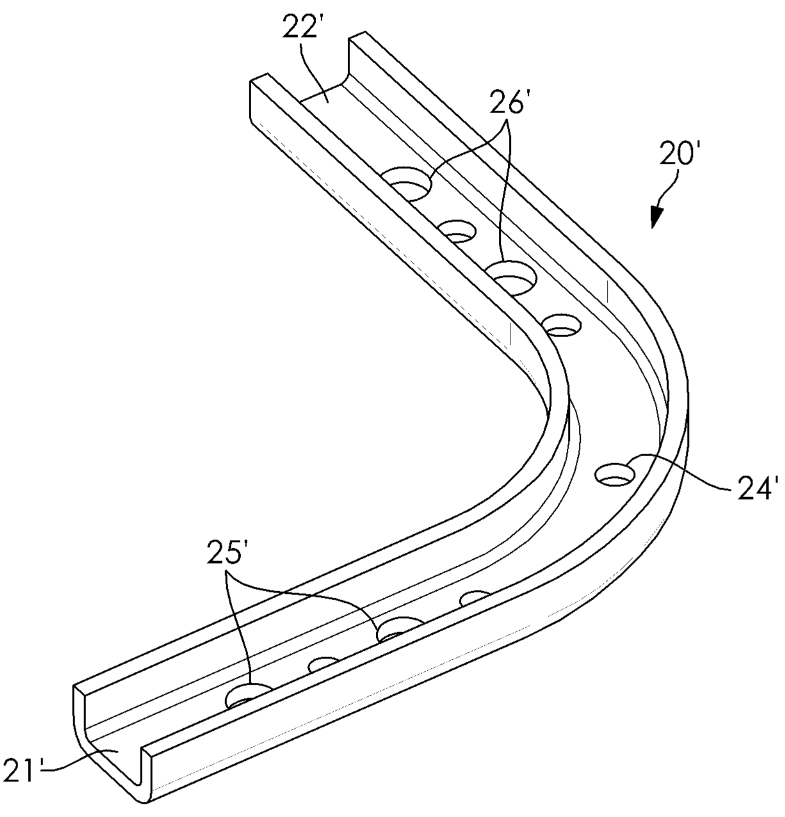
FIG. 6 is a perspective view of a main body portion of the member according to another embodiment of the present invention.
Figure 7:
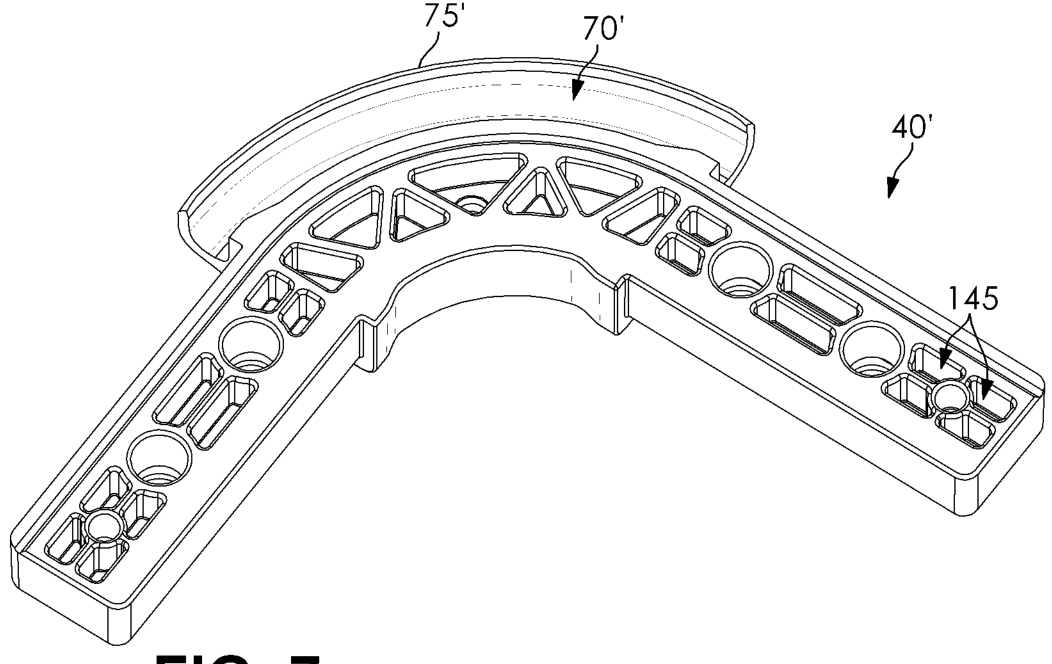
FIG. 7 is a perspective view of a half of a corner bracket including a sleeve formed around the main body portion of FIG. 6.

Referring now to FIGS. 4 and 5, a method of installing the corner bracket 10 with respect to a bow assembly 205 having a pair of bow members 210, 220 is disclosed, wherein the bow assembly 205 may form a portion of a tarp system having a plurality of the bow assemblies arranged in parallel in a configuration for forming an enclosure. The bow member 210 extends longitudinally in the first direction and the bow member 220 extends longitudinally in the second direction. The bow member 210 includes a longitudinally extending opening 211 and the bow member 220 includes a longitudinally extending opening 221. Each of the openings 211, 221 has a cross-sectional shape configured to receive either of the legs 15, 16 of the corner bracket 10 therein. In the illustrated embodiment, each of the openings 211, 221 is substantially rectangular in cross-sectional shape, although alternative cross-sectional shapes may be utilized. Each of the bow members 210, 220 further includes a tarp retention area 230 formed by a portion of each respective bow member 210, 220 having a C-shaped cross-section substantially corresponding in configuration to the tarp retention area 18 of the corner bracket 10. Each of the bow members 210, 220 further includes a plurality of mounting apertures 235 formed therein with each of the mounting apertures 235 positioned to be aligned with a corresponding set of the mounting apertures 65, 166, 66, 165 of the corner bracket 10 when the legs 15, 16 thereof are fully received within the openings 211, 221. A fastener 240 is fed through each of the aligned sets of mounting apertures 65, 66, 165, 166, 235 in order to affix a longitudinal position of each of the legs 15, 16 of the corner bracket 10 relative to the corresponding one of the bow members 210, 220. Each of the fasteners 240 may be a threaded bolt and nut assembly, as desired. However, alternative fasteners may be utilized while remaining within the scope of the present invention, including any form of pin of locking mechanism configured for reception through an aligned set of the mounting apertures 65, 66, 165, 166, 235.

Referring now to FIGS. 6-9 show a corner bracket 10' according to another embodiment of the present invention. Similar structure repeated from FIGS. 1-5 includes the same reference numerals and the prime (') symbol. Additionally, the structure description involving the structure of the corner bracket 10' is the same as described above for the corner bracket 10 and includes the same features and characteristics as described above (unless otherwise noted), including being formed from the same materials using the same manufacturing processes. The corner bracket 10' includes a main body portion 20' and a sleeve 40'. The main body portion 20' is substantially similar to the main body portion 20 except the main body portion 20' includes a substantially U-shaped cross-section in order to reduce the material utilized in forming the main body portion 20', which further aids in reducing an operational weight of the main body portion 20'.

The sleeve 40' is also substantially similar to the sleeve 40, except the sleeve 40' includes a plurality of indentations 145 formed therein when the sleeve 40' is molded over the main body portion 20'. The indentations 145 are positioned within the sleeve 40' to extend into the open space formed within the U-shaped cross-section of the main body portion 20', which results in the formation of open spaces within the member formed from the over molding of the main body portion 20' and the sleeve 40' for reducing an amount of material necessary for forming the sleeve 40'. The indentations 145 may be formed to include a depth wherein the indentations 145 do not reach the surface of the main body portion 20' when the sleeve 40' is molded over the main body portion 20', thereby maintaining maximized contact between the main body portion 20' and the sleeve 40' following the molding process used to form the resulting member, which is the same as that described above with reference to the main body portion 20 and the sleeve 40. The indentations 145 may be formed in the sleeve 40' to maintain a reinforcing configuration that minimizes the material necessary in forming the sleeve 40', such as forming intersecting ribs or the like. The sleeve 40' may be formed from the same materials described as forming the sleeve 40, and may be molded over the main body portion 20' in the same manner as described with reference to the molding of the sleeve 40 over the main body portion 20.

Figure 8:
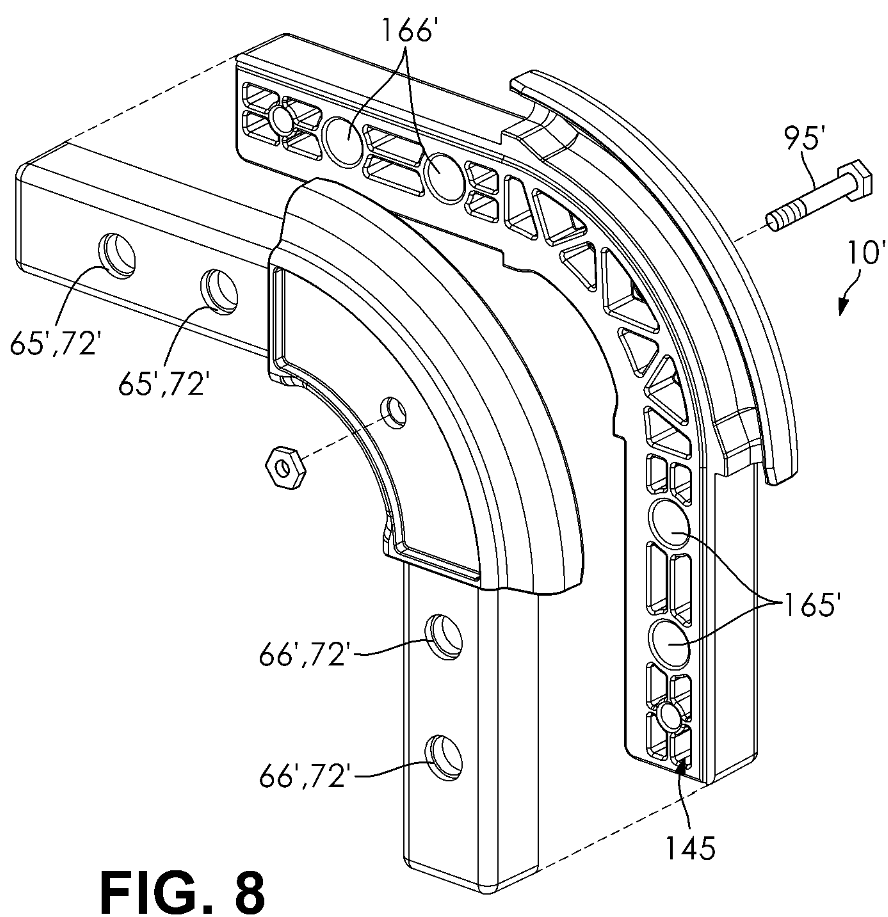
FIG. 8 is an exploded perspective view of both halves of the corner bracket shown in FIG. 7.
Figure 9:
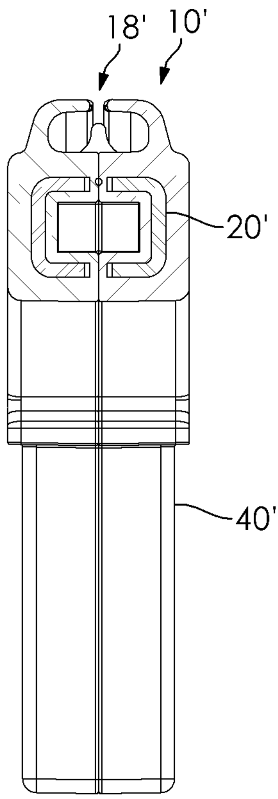
FIG. 9 is a cross-sectional view of the assembled corner bracket of FIG. 8.

As shown in FIGS. 8-9, the molding of the sleeve 40' over the main body portion 20' results in the corner bracket 10' that is that is formed from matching with another corresponding member of identical structure. This results in the corner bracket 10' in the same manner as described above with reference to the members 11, 12 forming the corner bracket 10. Additionally, the corner bracket 10' operates in substantially identical fashion to the corner bracket 10 as described with reference to FIGS. 4 and 5, hence further description is omitted herefrom.

The main body portion 20' and the sleeve 40' beneficially combine to form the corner bracket 10' having a reduced weight in comparison to the members 11, 12 of the corner bracket 10, while still maintaining the structural integrity necessary for the given application.

It should be understood that any of the features described with reference to the main body portion 20 and the sleeve 40 may also be utilized in the main body portion 20' and the sleeve 40', respectively, hence any combination of any of the disclosed features of any of the components 20, 40, 120, 140 may be within the scope of the present invention.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A corner bracket for a tarp system for a vehicle, the corner bracket comprising:

a pair of arcuate main body portions, each of the main body portions including a main body aperture formed therethrough;

a pair of sleeves, each of the sleeves disposed on each a corresponding one of the main body portions, each of the sleeves having a sleeve aperture aligned with the main body aperture of the corresponding one of the main body portions, wherein each of the sleeves includes a tarp retention channel configured to receive a portion of a tarp and a support pole therein, wherein each of the sleeves is produced from a polymeric material over molded onto the corresponding one of the main body portions, wherein each of the retention cavities is filled with the polymeric material during the over molding of the corresponding one of the main body portions; and a first fastener configured to be received through each of the main body apertures of the main body portions and each of the sleeve apertures of the sleeves to couple the main body portions together.

2. The corner bracket according to claim 1, wherein the main body portions are produced from steel.

3. The corner bracket according to claim 1, wherein the main body portions are produced from aluminum.

4. The corner bracket according to claim 1, wherein the sleeves are produced from a plastic.

5. The corner bracket according to claim 1, wherein a tarp retention area is formed by a pair of the tarp retention channels.

6. The corner bracket according to claim 5, wherein a lead-in edge is formed at an end of each of the tarp retention channels.

7. The corner bracket according to claim 1, wherein each of the main body portions includes a first linear leg and a second linear leg.

8. The corner bracket according to claim 7, wherein the first linear leg and the second linear leg of each of the main body portions are offset from each other at an angle of 90 degrees.

9. The corner bracket according to claim 8, wherein a portion of at least one of the first linear leg or the second linear leg is configured to be received in a bow member.

10. The corner bracket according to claim 8, wherein each of the first linear leg and the second linear leg of each of the main body portions includes a leg aperture formed therein configured to receive a second fastener therein to couple the portion of the at least one of the first linear leg or the second linear leg to the bow member.

11. The corner bracket according to claim 1, wherein each of the main body portions has a U-shaped cross-section.

12. The corner bracket according to claim 11, wherein each of the sleeves includes at least one indentation extending into a space formed within the U-shaped cross-section of a corresponding one of the main body portions.

13. The corner bracket according to claim 1, wherein the main body portions are identical to each other.

14. The corner bracket according to claim 1, wherein at least a portion of each of the main body portions is surrounded by the corresponding sleeve over molded thereon.

15. A method of producing a corner bracket, the method comprising steps of:

providing a pair of arcuate main body portions with each of the main body portions formed from a metallic material and including a main body aperture formed therethrough, wherein the main body portions are substantially identical to each other;

over molding a respective sleeve around each of the respective main body portions to form two halves of the corner bracket, wherein each of the sleeves includes a tarp retention channel formed thereon, wherein each of the sleeves is formed from a polymeric material and includes a sleeve aperture formed therethrough, and wherein the over molding retains each sleeve to the corresponding one of the main body portions; and joining the two halves to one another with a fastener that extends through each of the main body apertures of the main body portions and each of the sleeve apertures of the sleeves.

16. The method according to claim 15, wherein a tarp retention area is formed by disposing the tarp retention channel of each of the sleeves in facing relationship to one another.

17. A corner bracket for a tarp system for a vehicle, the corner bracket comprising:

a pair of arcuate main body portions, each of the main body portions including a main body aperture formed therethrough, wherein each of the main body portions is formed from a metallic material;

a pair of sleeves, each of the sleeves disposed on a corresponding one of the main body portions, each of the sleeves having a sleeve aperture aligned with the main body aperture of the corresponding one of the main body portions, wherein each of the sleeves includes a tarp retention channel configured to receive a portion of a tarp and a support pole therein, wherein each of the sleeves is produced from a polymeric material over molded onto the corresponding one of the main body portions; and a fastener configured to be received through each of the main body apertures of the main body portions and each of the sleeve apertures of the sleeves to couple the main body portions together.

* * * * *